(12) United States Patent
Rumberger et al.

(10) Patent No.: US 7,270,370 B2
(45) Date of Patent: Sep. 18, 2007

(54) REMOVABLE MEDIA STORAGE COMPARTMENT

(75) Inventors: Ryan Rumberger, Canton, MI (US); James Lawrence Zucal, Novi, MI (US); Marty Petersen, Canton, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 409 days.

(21) Appl. No.: 10/762,556

(22) Filed: Jan. 23, 2004

(65) Prior Publication Data

US 2005/0161481 A1    Jul. 28, 2005

(51) Int. Cl.
*B60R 7/004* (2006.01)
*B60R 7/005* (2006.01)

(52) U.S. Cl. ........................ 296/214; 224/311; 296/37.7

(58) Field of Classification Search ................ 224/311, 224/312, 309, 328, 42.2, 580; 206/308.1; 296/37.1, 37.7, 37.8, 210, 214
See application file for complete search history.

(56) References Cited

U.S. PATENT DOCUMENTS

| | | | | |
|---|---|---|---|---|
| 2,236,428 A * | 3/1941 | Haas | .......................... | 296/37.7 |
| 4,079,987 A * | 3/1978 | Bumgardener | ............. | 296/37.7 |
| 4,180,299 A * | 12/1979 | Tolerson | ...................... | 312/242 |
| 4,469,365 A | 9/1984 | Marcus et al. | | |
| 4,738,481 A * | 4/1988 | Watjer et al. | .............. | 296/37.8 |
| 4,984,137 A * | 1/1991 | Maemura | ..................... | 362/492 |
| 5,062,559 A * | 11/1991 | Falcoff | ......................... | 224/311 |
| 5,154,617 A * | 10/1992 | Suman et al. | ................. | 439/34 |
| 5,190,153 A * | 3/1993 | Schultz et al. | ............ | 206/308.1 |
| 5,213,243 A * | 5/1993 | Landon | ....................... | 224/277 |
| 5,239,449 A * | 8/1993 | Wnuk et al. | ................. | 362/490 |
| 5,310,234 A * | 5/1994 | Klein | .......................... | 296/37.7 |
| 5,329,947 A * | 7/1994 | Shikler | ........................ | 132/304 |
| 5,331,525 A * | 7/1994 | Lawassani et al. | ......... | 362/140 |
| 5,377,860 A * | 1/1995 | Littlejohn et al. | ........... | 220/790 |
| 5,466,028 A | 11/1995 | Nicopolis | | |
| D369,777 S * | 5/1996 | Singh et al. | ................ | D12/417 |
| 5,590,827 A * | 1/1997 | Nimpoeno | ................... | 224/312 |
| 5,653,364 A * | 8/1997 | Eskandry | ..................... | 224/312 |
| 5,762,246 A | 6/1998 | Drew | | |
| 6,019,411 A * | 2/2000 | Carter et al. | ................ | 296/37.7 |
| 6,024,400 A * | 2/2000 | Donoughe et al. | ......... | 296/97.5 |
| 6,065,793 A * | 5/2000 | Koshida et al. | ............. | 296/37.1 |
| D432,490 S * | 10/2000 | Golenz | ....................... | D12/417 |
| D432,981 S * | 10/2000 | Eskandry | ................... | D12/417 |
| 6,135,528 A * | 10/2000 | Sobieski et al. | ............ | 296/37.7 |
| 6,176,536 B1 * | 1/2001 | Miller et al. | ................ | 296/37.7 |

(Continued)

FOREIGN PATENT DOCUMENTS

JP    8-230568 A    9/1996

(Continued)

OTHER PUBLICATIONS

Herrington, Summer 2003 Catalog, 2 pages.

*Primary Examiner*—D. Glenn Dayoan
*Assistant Examiner*—Paul Chenevert
(74) *Attorney, Agent, or Firm*—Foley & Lardner LLP

(57) ABSTRACT

A storage compartment for a vehicle includes a base configured to be attached to a passenger compartment side portion of a vehicle roof. The storage compartment additionally includes a portable member that has at least one pocket. The portable member is configured to be releasably engaged with the base.

46 Claims, 12 Drawing Sheets

U.S. PATENT DOCUMENTS

| | | | |
|---|---|---|---|
| 6,216,930 B1 * | 4/2001 | Plocher et al. | 224/539 |
| 6,338,517 B1 * | 1/2002 | Canni et al. | 296/37.8 |
| D453,728 S * | 2/2002 | Hassett | D12/417 |
| 6,659,529 B2 * | 12/2003 | Palmer et al. | 296/97.6 |
| 6,669,260 B2 * | 12/2003 | Clark et al. | 296/37.8 |
| 6,722,719 B1 * | 4/2004 | Sturt | 296/37.8 |
| 6,789,843 B2 * | 9/2004 | De Gaillard | 296/216.07 |
| 6,863,025 B2 * | 3/2005 | Ness | 119/72 |
| 6,932,202 B2 * | 8/2005 | Houseberg | 190/29 |
| 2002/0125154 A1 * | 9/2002 | Abeyta et al. | 206/308.1 |
| 2002/0163218 A1 * | 11/2002 | Stubbings et al. | 296/37.7 |
| 2003/0098595 A1 * | 5/2003 | Carter et al. | 296/146.15 |
| 2003/0183667 A1 * | 10/2003 | Mantis | 224/312 |
| 2003/0213208 A1 * | 11/2003 | Belanger | 52/737.3 |
| 2004/0154204 A1 * | 8/2004 | Fu | 40/661.01 |
| 2005/0218169 A1 * | 10/2005 | Lau | 224/312 |
| 2005/0242628 A1 * | 11/2005 | Schultz et al. | 296/214 |

FOREIGN PATENT DOCUMENTS

| | | | |
|---|---|---|---|
| JP | 08-230568 | * | 10/1996 |
| JP | 2002-240636 | * | 8/2002 |
| JP | 2002-240636 A | | 8/2002 |
| JP | 2002-331862 A | | 11/2002 |

* cited by examiner

REMOVABLE MEDIA STORAGE COMPARTMENT

BACKGROUND OF THE INVENTION

1. Field of the Invention

The invention relates generally to media storage compartments, and more particularly to removable media storage compartments mounted to a vehicle roof area in a vehicle interior.

2. Background of the Invention

After-market compact disc (CD) storage devices that attach to a vehicle sun visor are presently known. One such storage device is disclosed in U.S. Pat. No. 5,762,246, which is incorporated herein by reference. Storage compartments of this variety are typically attached to the vehicle sun visor to provide stowage and retrieval of CDs when the vehicle sun visor is in the lowered position. However, CD storage devices of this variety may suffer from various disadvantages. For example, a CD storage device that is attached to a vehicle sun visor may be visible within the vehicle passenger area, thus detracting from the overall appearance of the vehicle interior. Additionally, to facilitate easy removal and installation, conventional CD storage devices are typically loosely coupled to the vehicle sun visor with simple fasteners such as elastic bands, which may cause the CD storage compartment to unintentionally misaligned.

SUMMARY OF THE INVENTION

The storage compartment of the invention includes a base configured to be attached to a passenger compartment side portion of a vehicle roof. The storage compartment further includes a portable member that has at least one pocket. The portable member is configured for releasable engagement with the base.

Another aspect of the present invention relates to a portable media storage device. The storage device includes a support member that has a front surface and a back surface. The front surface of the support member includes at least one pocket. The support member is configured to releasably engage with a base recessed within a passenger compartment side portion of a vehicle roof.

BRIEF DESCRIPTION OF THE DRAWINGS

The accompanying drawings, which are incorporated in and constitute a part of this specification, illustrate embodiments of the invention and together with the description serve to explain principles of the invention.

DETAILED DESCRIPTION OF SPECIFIC EMBODIMENTS

Reference will now be made in detail to presently preferred embodiments of the invention. Wherever possible, the same reference numbers will be used throughout the drawings to refer to the same or like parts. The following description will describe various embodiments useable in a vehicle, such as a car, a consumer truck, a commercial truck, a van, a sport utility vehicle, and other vehicles. Other applications may also be plausible, as will be readily apparent to one of ordinary skill in the art after reading this disclosure.

Figure 1:
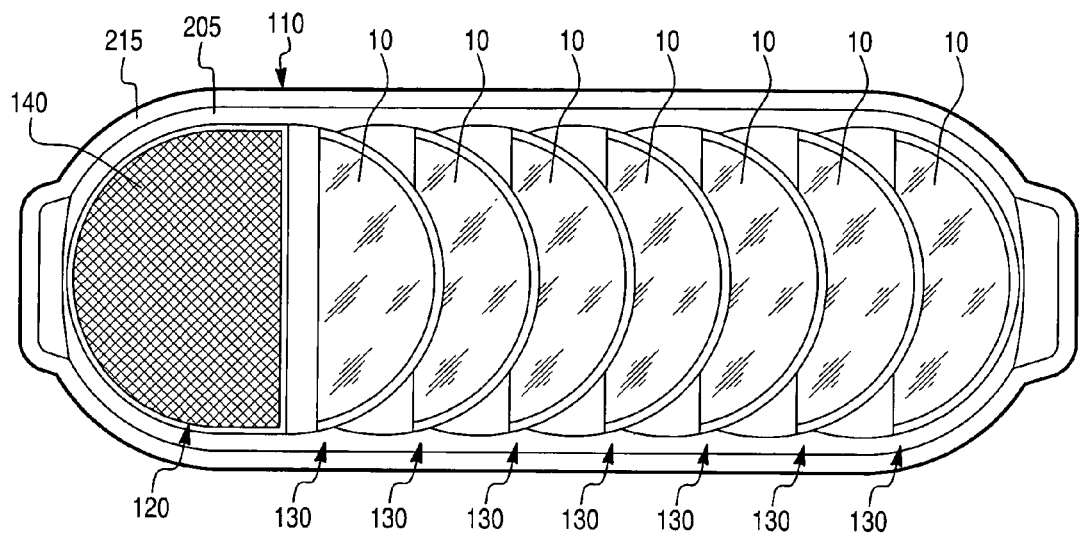
FIG. 1 is a top view of a storage compartment according to an embodiment of the present invention.
Figure 2:
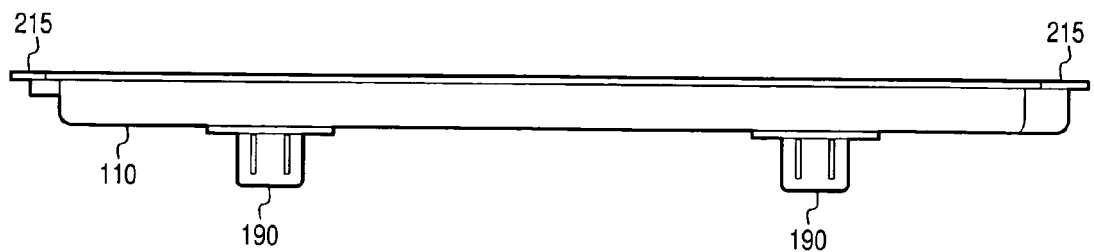
FIG. 2 is a side view of the storage compartment of FIG. 1.

As shown in FIGS. 1 and 2, a storage compartment according to an embodiment of the present invention includes a base 110 and a portable member 120. The base 110 may be formed of a durable material, such as a plastic or polymeric material, and may have an oblong or oval shape. The base 110 includes a lower surface 205 and an edge 215. The edge 215 is disposed along a periphery of the lower surface 205 and projects outwardly from the lower surface 205. The base 110 is adapted to be mounted to a roof of a passenger compartment of a vehicle. For example, the base 110 may include an attachment mechanism 190 disposed on an underside of the base 110, as shown in FIG. 2. The attachment mechanism 190 may include various mechanical fasteners. For example, the base 110 may include interlocking clips (or tabs) configured to engage with corresponding fasteners disposed on the roof. Other modes of attachment may also be contemplated. For example, the base 110 may be attached to the roof using an adhesive material.

The base 110 is configured to releasably engage with the portable member 120. According to an embodiment of the present invention, the lower surface 205 of the base 120 may include fasteners (not shown) adapted to releasably engage with corresponding fasteners disposed on an underside of the portable member 120. The fasteners may be, for example, magnetic fasteners, snaps, or interlocking clips/tabs. In this manner, a user may install the portable member 120 in the base 110 when the user is in the vehicle. When the user exits the vehicle, the portable member 120 may be disengaged from the base 110 and carried with the user to his or her final destination. Thus, the portable member 120 may be removed from the base 110 to allow the user to transport items between the vehicle and another location.

The portable member 120 has a shape corresponding to the shape of the base 110, as shown in FIG. 1. The portable member 120 includes at least one media storage slot (or pocket) 130 configured to store one or more types of media 10, such as a compact disc (CD), a digital video disc (DVD), a mini-disc, a cassette, or other recorded media, therein. For illustration purposes, CDs are shown throughout the figures. The portable member 120 may include more than one media storage slot 130. For example, the portable member 120 may include a plurality of slots 130 arranged to allow the media 10 stored therein to be stowed and removed from the slots 130. For example, as shown in FIG. 1, the slots 130 may be aligned (or stacked) one upon the other in an offset manner such that a portion of each slot is exposed relative to a consecutive slot. Thus, a portion of each slot 130 is accessible to receive the media 10. When configured in such a manner, the slots 130 form a substantially planar body corresponding to the shape of the portable member 120. It should be appreciated that other configurations are also plausible, such as having the openings for one or more of slots 130 facing different directions (e.g., for different types of media stored therein).

Additionally, a storage area (or pouch) 140 may be provided on the portable member 120. The storage area 140 may be configured to stow various items, such as sunglasses, garage door openers, keys, cellular phones, maps, pens/pencils, or other items, therein. The storage area 140 may be formed of netting/mesh or transparent type material to allow a vehicle occupant to view the items stowed within the storage area 140.

Figure 3:
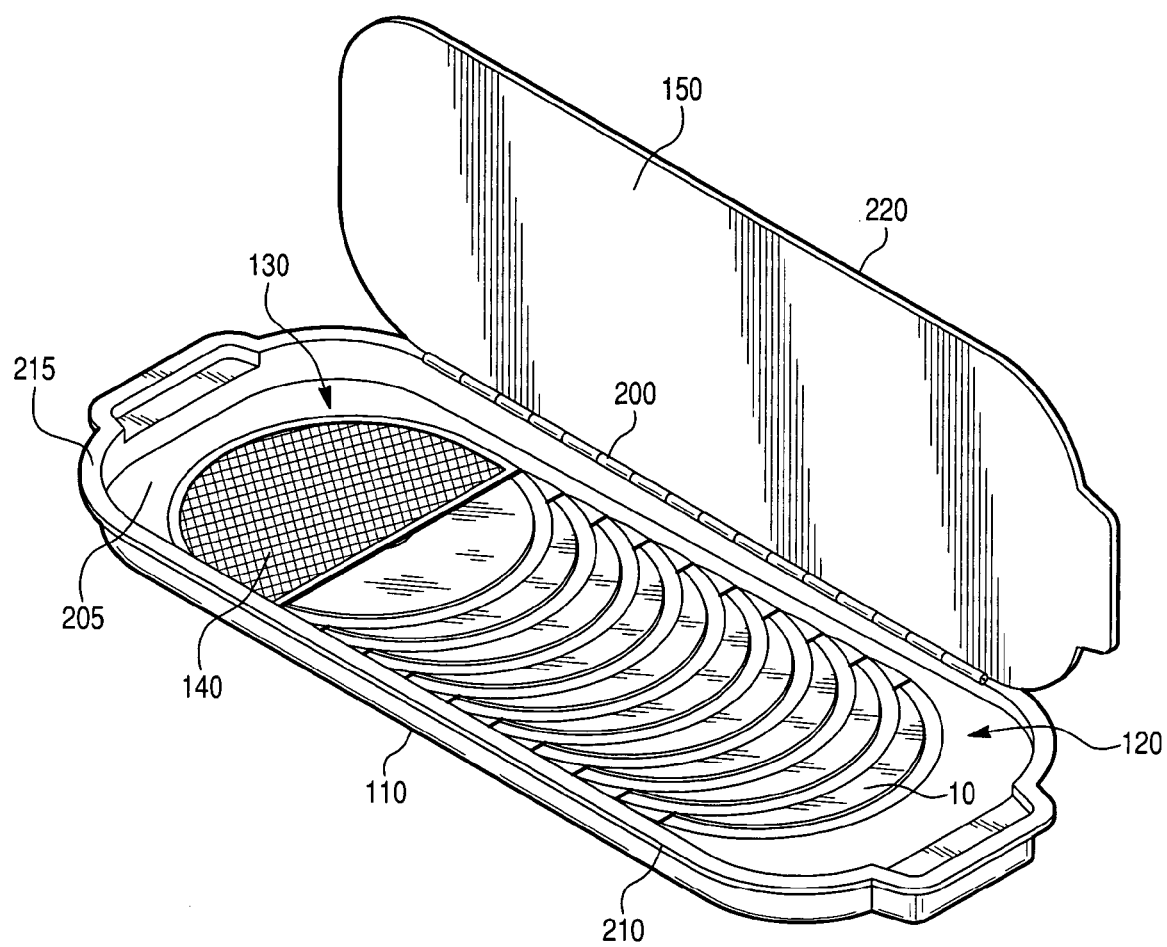
FIG. 3 is a perspective view of a storage compartment according to an embodiment of the present invention.

FIG. 3 shows a storage compartment according to another embodiment of the present invention. This embodiment is similar to the previous embodiment except that the portable member 120 has a slightly different shape than the previous embodiment and includes a greater number of slots 130. Additionally, the storage compartment includes a cover 150 configured to operatively retain and protect the media 10 stored in the portable member 120. The cover 150 may be coupled to the base 110 by a hinge positioned along a first elongated side 200 of the base 110, as shown in FIG. 3. The cover 150 is moveable between an open position and a closed position. In the closed position (not shown), a distal (or non-hinged) edge 220 of the cover is disposed adjacent to a second elongated side 210 of the base 110 such that the cover 150 shields or protects the slots 130. In operation, the cover 150 is opened by moving the distal edge 220 of the cover 150 away from the second elongated edge 210 of the base 110. In the open position (shown in FIG. 3), the media storage slots 130 are exposed. Alternatively, it is contemplated that the cover 150 may be formed as a slide cover (not shown) adapted to engage the elongated sides 200 and 210 of base 110 to provide translational movement between the cover 150 and the base 110.

Figure 4:
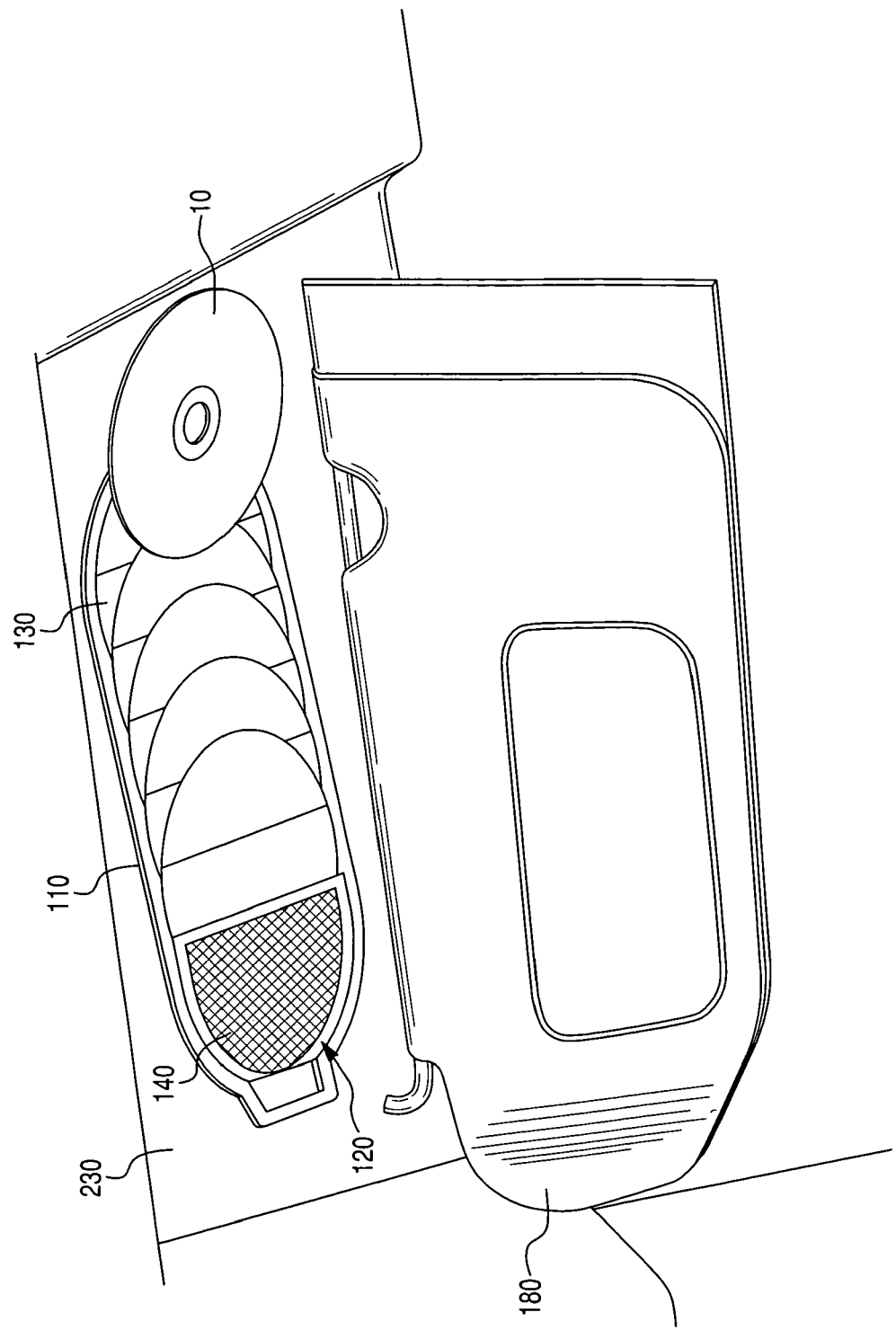
FIG. 4 is a perspective view of a storage compartment according to an embodiment of the present invention.

FIG. 4 shows a storage compartment according to another embodiment of the present invention. This embodiment is similar to the previous embodiments except that the portable member 120 has a slightly different shape and fewer slots 130. Additionally, the base 110 is adapted to be recessed within a roof of a passenger compartment of a vehicle. For example, the vehicle may include a headliner 230 extending from a roof of a vehicle body generally toward the passenger compartment. The headliner 230 defines an interior surface of the roof of the passenger compartment. The base 110 may be recessed within the headliner 230 such that the storage compartment does not substantially extend or protrude into the passenger compartment. In this manner, the storage compartment 100 is visually and functionally desirable. Moreover, the recessed configuration enables the storage compartment to be disposed in the roof near a sun visor 180 such that the storage compartment may be concealed from view when the sun visor is in a stored position (not shown). Thus, the aesthetics of the vehicle are improved over that of a vehicle having a conventional after market storage device mounted to the sun visor.

Figure 5:
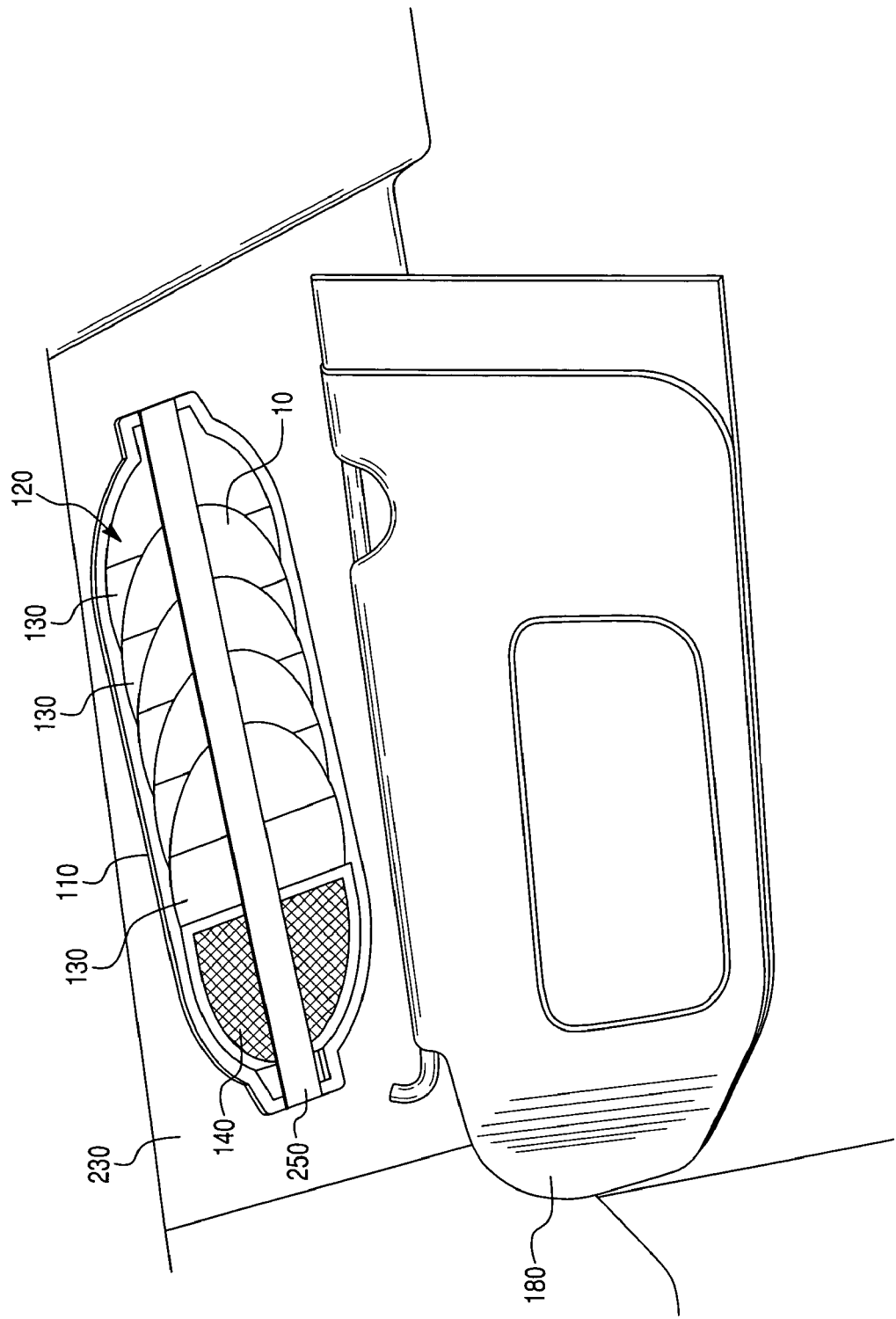
FIG. 5 is a perspective view of a storage compartment according to an embodiment of the present invention.

FIG. 5 shows a storage compartment according to another embodiment of the present invention. This embodiment is similar to the previous embodiment except the storage compartment includes a cover fashioned as a strap 250. The strap 250 may be, for example, an elastic member. In a closed position, the strap 250 is configured to extend from a first end of the base 110 to a second end of the base 110. In this manner, the strap 250 extends over the slots 130 to retain and protect the media 10 stored in the slots 130. Other configurations, such as zippered or snap down covers, are also contemplated and will be readily apparent to one of ordinary skill in the art after reading the disclosure.

Figure 6:
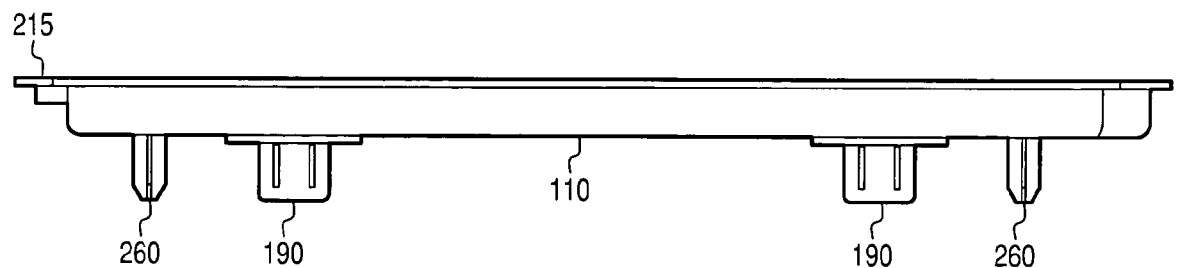
FIG. 6 is a side view of a storage compartment according to an embodiment of the present invention.

FIG. 6 shows a storage compartment according to another embodiment of the present invention. This embodiment is similar to the previous embodiments except the base 110 includes locating members 260 which project from an underside of the base 110 and are configured to engage with corresponding apertures disposed on the roof so that the base 110 may be properly positioned or aligned on the roof.

Figure 7:
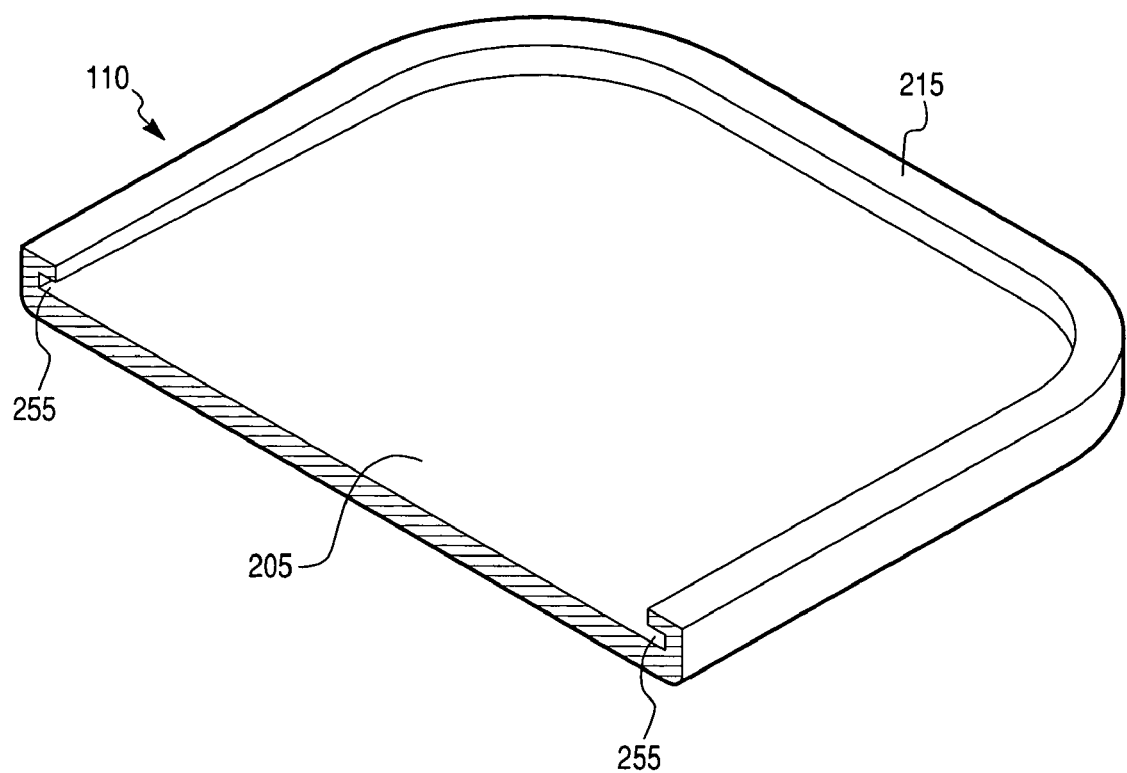
FIG. 7 is a cross sectional perspective view of a storage compartment according to an embodiment of the present invention.
Figure 8:
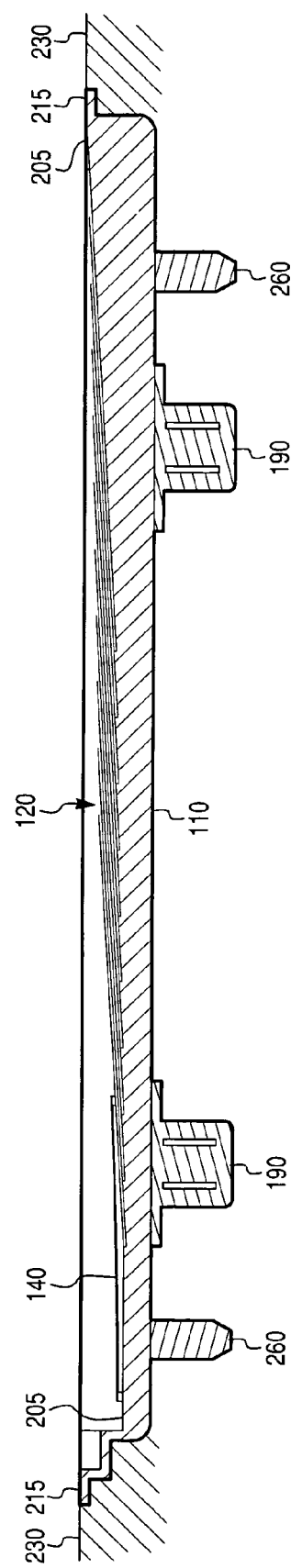
FIG. 8 is cross sectional side view of the storage compartment of FIG. 7.

FIGS. 7 and 8 shown a storage compartment according to another embodiment of the present invention. This embodiment is similar to the previous embodiments except the edge 215 of the base 110 may include a C-channel 255 formed along an inner periphery of the edge 215, as shown in FIG. 7. The C-channel 255 is configured to receive a peripheral portion of the portable member 120. According to this embodiment, the edge 215 encompasses only three sides of the base 110 so that the portable member 120 may slide into and out of the base 110. Additionally, according to this embodiment, the base 110 is recessed in the headliner 230 such that an upper surface of the edge 215 is substantially coplanar (or flush) with the interior surface of the headliner 230, as shown in FIG. 8. Thus, the storage compartment is visually and functionally unobtrusive because the storage compartment does not substantially protrude into the passenger compartment. In addition, as shown in FIG. 8, the lower surface 205 of the base 110 may slope upward from a first end of the base 110 to a second end of the base 110, as shown in FIG. 8. The sloped surface enables a user to slidably engage and disengage the portable member 120 and the base 110 when the base 110 is recessed in a vehicle headliner 230 or roof. Thus, the portable member 120 may be removed from the base 110 to allow the user to transport items between the vehicle and another location.

Figure 9:
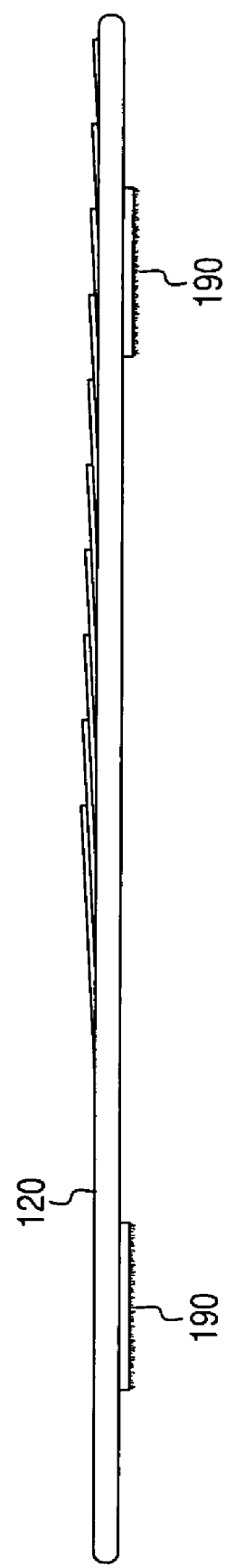
FIG. 9 is a side view of a storage compartment according to an embodiment of the present invention.

FIG. 9 shows a storage compartment according to another embodiment of the present invention. This embodiment is similar to the previous embodiments except that fasteners 290 disposed on an underside of the portable member 290 are illustrated. The fasteners 290 are adapted to releasably engage with the corresponding fasteners disposed on the lower surface 205 of the base 110 (as discussed above). The fasteners 290 may be, for example, hook and loop type fasteners such as VELCRO® (shown in FIG. 9), magnetic fasteners, snaps, or interlocking clips/tabs.

Figure 10:
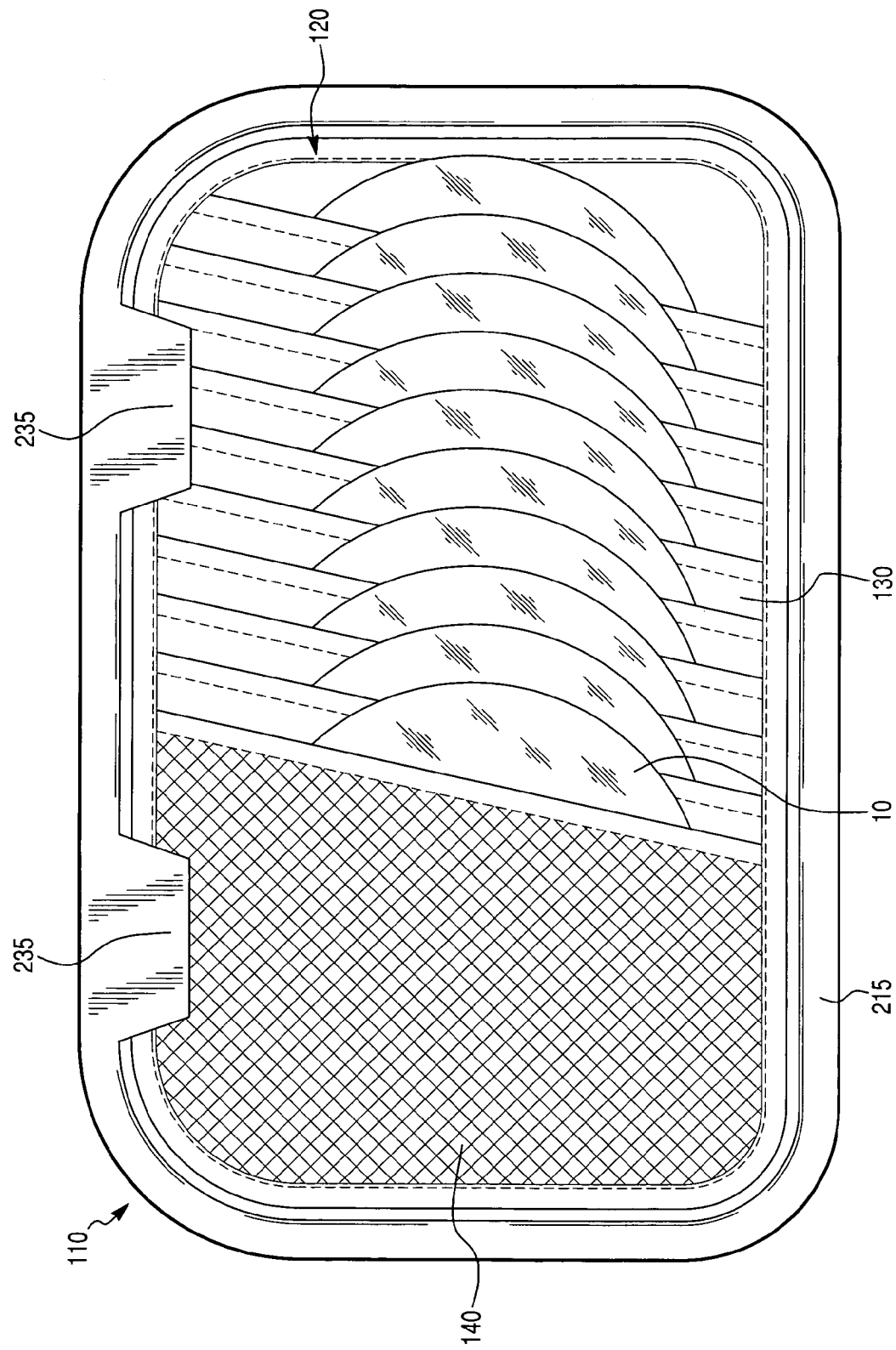
FIG. 10 is a top view of a storage compartment according to an embodiment of the present invention.
Figure 11:
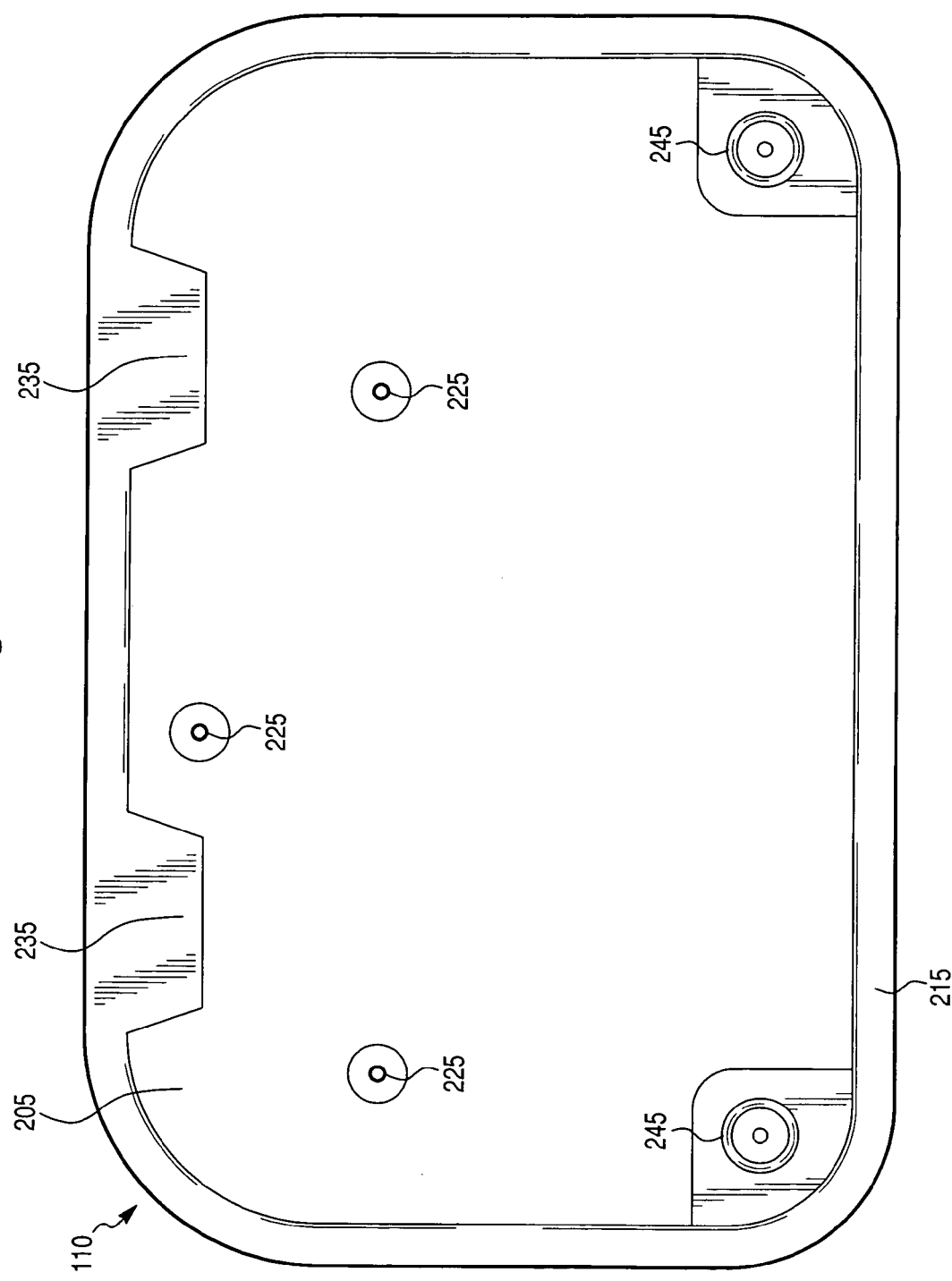
FIG. 11 is a top view of a base of the storage compartment of FIG. 10.
Figure 12:
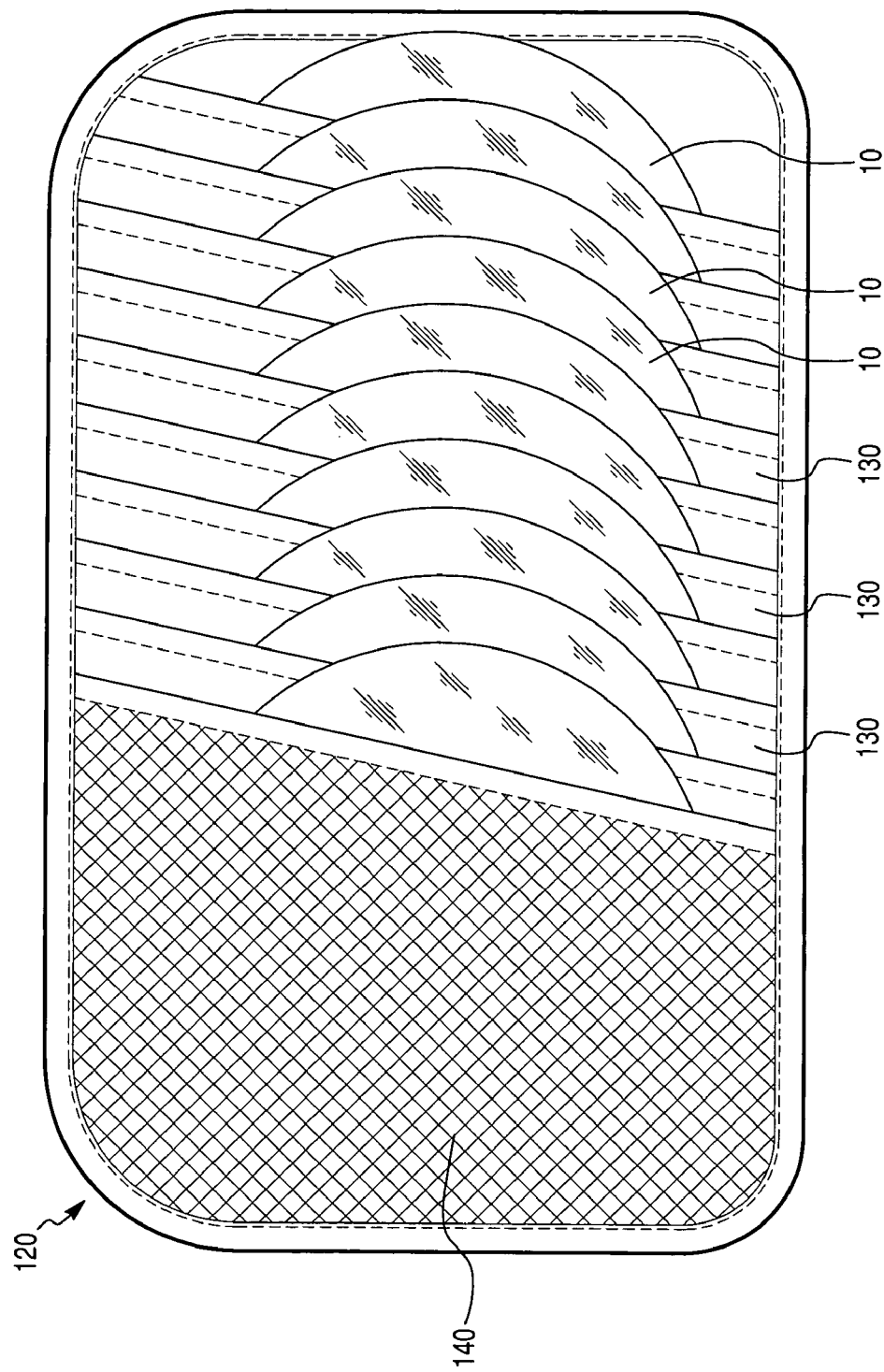
FIG. 12 top view of a portable member of the storage compartment of FIG. 10.
Figure 13:
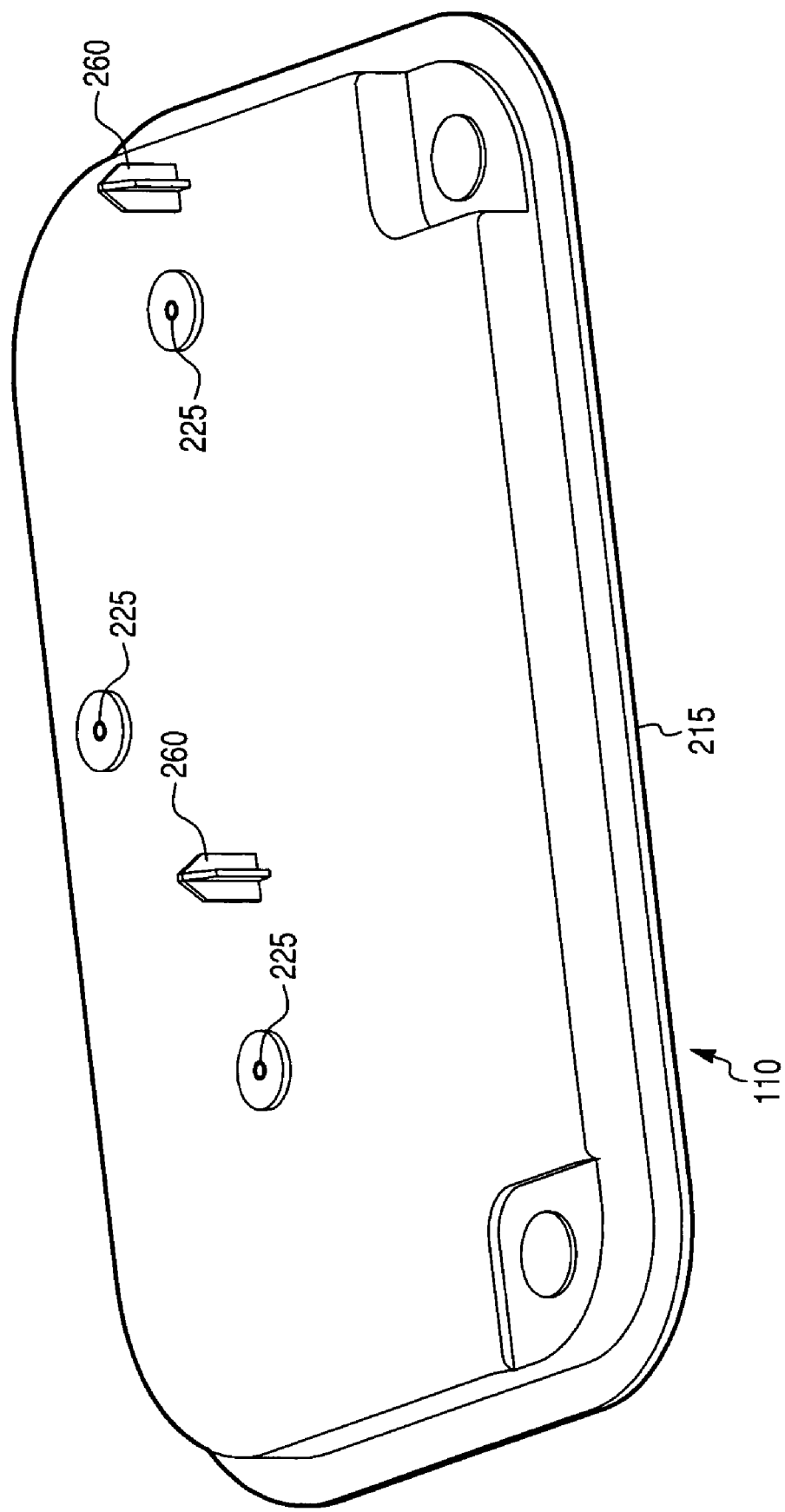
FIG. 13 is bottom perspective view of the base of the storage compartment of FIG. 10.

FIGS. 10 to 13 show a storage compartment according to another embodiment of the present invention. This embodiment is similar to the previous embodiments except the shape of the base 110 may be, for example, rectangular or trapezoidal. According to this embodiment, the base 110 may include holes 225 (shown in FIGS. 11 and 13) for attaching the base 110 to the roof. Each hole 225 is configured to receive a screw (not shown). The screw can then be threaded into the roof to secure the base 110 to the roof. The base 110 may also include retaining members (or fingers) 235, as shown in FIGS. 10 and 11, for locating and retaining the portable member 120 in the base 110. The retaining members 235 are disposed on an upper surface of the edge 215 on one side of the base 110. The retaining members 235 project beyond the edge 215 toward an opposite side of the base 110. In this manner, the retaining members 235 comprise an extension of the upper surface of the edge 215. In operation, a user may locate and retain the portable member 120 in the base 110 (as shown in FIG. 10) by positioning an edge of the portable member 120 in the base 110 under the retaining members 235 and then lowering an opposing edge of the portable member 120 into the base 110. The opposing edge of the portable member 120 may then be engaged with fasteners disposed on the lower surface 205 of the base 110. For example, as shown in FIG. 11, the opposing edge of the portable member 120 may engage with snaps 245 disposed along the edge 215 of the base 110.

Thus, methods and apparatuses for storing items in a vehicle according to various embodiments of the present invention have been described. Modifications and variations may be made to the techniques and structures described and illustrated herein without departing from the spirit and scope of the invention. By way of example, various embodiments may be mounted above a driver side of a vehicle interior, a passenger side of the vehicle interior, or between the driver and passenger sides of the vehicle interior. Accordingly, it should be understood that the methods and apparatus described herein are illustrative only and are not limiting upon the scope of the invention.

What is claimed is:

1. A removable storage compartment arrangement for a vehicle, comprising:
    a headliner that defines an interior surface of a passenger compartment;
    a base located at a position that is at least partially covered by a sun visor when the sun visor is in a stored position; and
    a portable storage member being adapted to releasably engage with the base with a fastener,
    wherein the headliner is configured and dimensioned to receive the base within the headliner, and at least a portion of the portable storage member engaged with the base is concealed from view by the sun visor when the sun visor is in the stored position.

2. The removable storage compartment arrangement of claim 1, wherein the portable storage member engaged with the base does not substantially extend into the passenger compartment relative to an inner surface of the headliner.

3. The removable storage compartment arrangement of claim 1, wherein the base is formed of a durable material.

4. The removable storage compartment arrangement of claim 1, wherein the base is formed of a plastic or polymeric material.

5. The removable storage compartment arrangement of claim 1, wherein the headliner has a recessed portion to receive the base within the headliner.

6. The removable storage compartment arrangement of claim 1, wherein the fastener comprises a magnetic fastener.

7. The removable storage compartment arrangement of claim 1, wherein the fastener comprises a hook and loop type fastener.

8. The removable storage compartment arrangement of claim 1, wherein the fastener comprises an interlocking clip.

9. The removable storage compartment arrangement of claim 1, wherein the fastener comprises a snap.

10. The removable storage compartment arrangement of claim 1, wherein the portable storage member comprises a portable media storage member.

11. The removable storage compartment arrangement of claim 1, wherein the fastener is configured to release by pulling the portable storage member downward.

12. The removable storage compartment arrangement of claim 1, wherein the portable storage member includes at least one media storage slot.

13. The removable storage compartment arrangement of claim 12, wherein the media storage slot is configured to receive a disc shaped media therein.

14. The removable storage compartment arrangement of claim 1, wherein the portable storage member includes a storage pouch.

15. The removable storage compartment arrangement of claim 14, wherein the storage pouch comprises a mesh material.

16. The removable storage compartment arrangement of claim 1, wherein the base includes a recessed central portion and a peripheral edge that extends outwardly from the recessed central portion.

17. The removable storage compartment arrangement of claim 16, wherein the base includes a c-channel arranged along an interior of the peripheral edge, the c-channel is configured to receive a peripheral edge of the portable storage member.

18. The removable storage compartment arrangement of claim 16, wherein the base includes at least one retaining member that projects beyond one side of the peripheral edge toward an opposite side of the peripheral edge, the retaining member is configured to locate and retain the portable storage member in the base.

19. The removable storage compartment arrangement of claim 18, wherein the fastener is arranged along the opposite side of the peripheral edge.

20. The removable storage compartment arrangement of claim 16, wherein the recessed central portion of the base is configured to be recessed relative to a contour of an adjacent portion of an inner surface of the headliner.

21. The removable storage compartment arrangement of claim 20, wherein the peripheral edge of the base is configured to be substantially coplanar with the adjacent portion of the inner surface of the headliner.

22. The removable storage compartment arrangement of claim 20, wherein the portable storage member engaged with the base does not extend appreciably beyond the contour of the adjacent portion of the inner surface of the headliner into the passenger compartment.

23. A removable media storage compartment arrangement for a vehicle, comprising:
    a headliner having an inner surface that defines an interior surface of a passenger compartment;
    a base; and
    a portable media storage member being adapted to releasably engage with the base with a fastener,
    wherein the headliner is configured and dimensioned to receive the base such that the base is recessed within the headliner and the portable media storage member engaged with the base does not substantially extend into the passenger compartment relative to the inner surface of the headliner.

24. The removable media storage compartment arrangement of claim 23, wherein the base is located in the headliner at a position that is covered by a sun visor when the sun visor is in a stored position, at least a portion of the portable media storage member engaged with the base is concealed from view by the sun visor when the sun visor is in the stored position.

25. The removable media storage compartment arrangement of claim 23, wherein the portable media storage member engaged with the base does not extend into the passenger compartment relative to an inner surface of the headliner.

26. The removable media storage compartment arrangement of claim 23, wherein the base is formed of a durable material.

27. The removable media storage compartment arrangement of claim 23, wherein the base is formed of a plastic or polymeric material.

28. The removable media storage compartment arrangement of claim 23, wherein the headliner has a recessed portion to receive the base within the headliner.

29. The removable media storage compartment arrangement of claim 23, wherein the fastener comprises a magnetic fastener.

30. The removable media storage compartment arrangement of claim 23, wherein the fastener comprises a hook and loop type fastener.

31. The removable media storage compartment arrangement of claim 23, wherein the fastener comprises an interlocking clip.

32. The removable media storage compartment arrangement of claim 23, wherein the fastener comprises a snap.

33. The removable storage compartment arrangement of claim 23, wherein the fastener is configured to release by pulling the portable media storage member downward.

34. The removable media storage compartment arrangement of claim 23, wherein the base includes a cover configured operatively to shield the portable media storage member.

35. The removable media storage compartment arrangement of claim 34, wherein the cover is configured to be operatively moveable between an open position and a closed position about a pivot.

36. The removable media storage compartment arrangement of claim 23, wherein the portable media storage member includes at least one media storage slot.

37. The removable media storage compartment arrangement of claim 36, wherein the media storage slot is configured to receive a disc shaped media therein.

38. The removable media storage compartment arrangement of claim 23, wherein the portable media storage member includes a storage pouch.

39. The removable media storage compartment arrangement of claim 38, wherein the storage pouch comprises a mesh material.

40. The removable media storage compartment arrangement of claim 23, wherein the base includes a recessed central portion and a peripheral edge that extends outwardly from the recessed central portion.

41. The removable media storage compartment arrangement of claim 40, wherein the base includes a c-channel arranged along an interior of the peripheral edge, the c-channel is configured to receive a peripheral edge of the portable media storage member.

42. The removable media storage compartment arrangement of claim 40, wherein the base includes at least one retaining member that projects beyond one side of the peripheral edge toward an opposite side of the peripheral edge, the retaining member is configured to locate and retain the portable media storage member in the base.

43. The removable media storage compartment arrangement of claim 42, wherein the fastener is arranged along the opposite side of the peripheral edge.

44. The removable media storage compartment arrangement of claim 40, wherein the recessed central portion of the base is configured to be recessed relative to a contour of an adjacent portion of an inner surface of the headliner.

45. The removable media storage compartment arrangement of claim 44, wherein the peripheral edge of the base is configured to be substantially coplanar with the adjacent portion of the inner surface of the headliner.

46. The removable media storage compartment arrangement of claim 44, wherein the portable media storage member engaged with the base does not extend appreciably beyond the contour of the adjacent portion of the inner surface of the headliner into the passenger compartment.

* * * * *